No. 613,012. Patented Oct. 25, 1898.
S. B. LEE.
COMBINED PITCHFORK AND RAKE.
(Application filed Sept. 13, 1897.)
(No Model.)
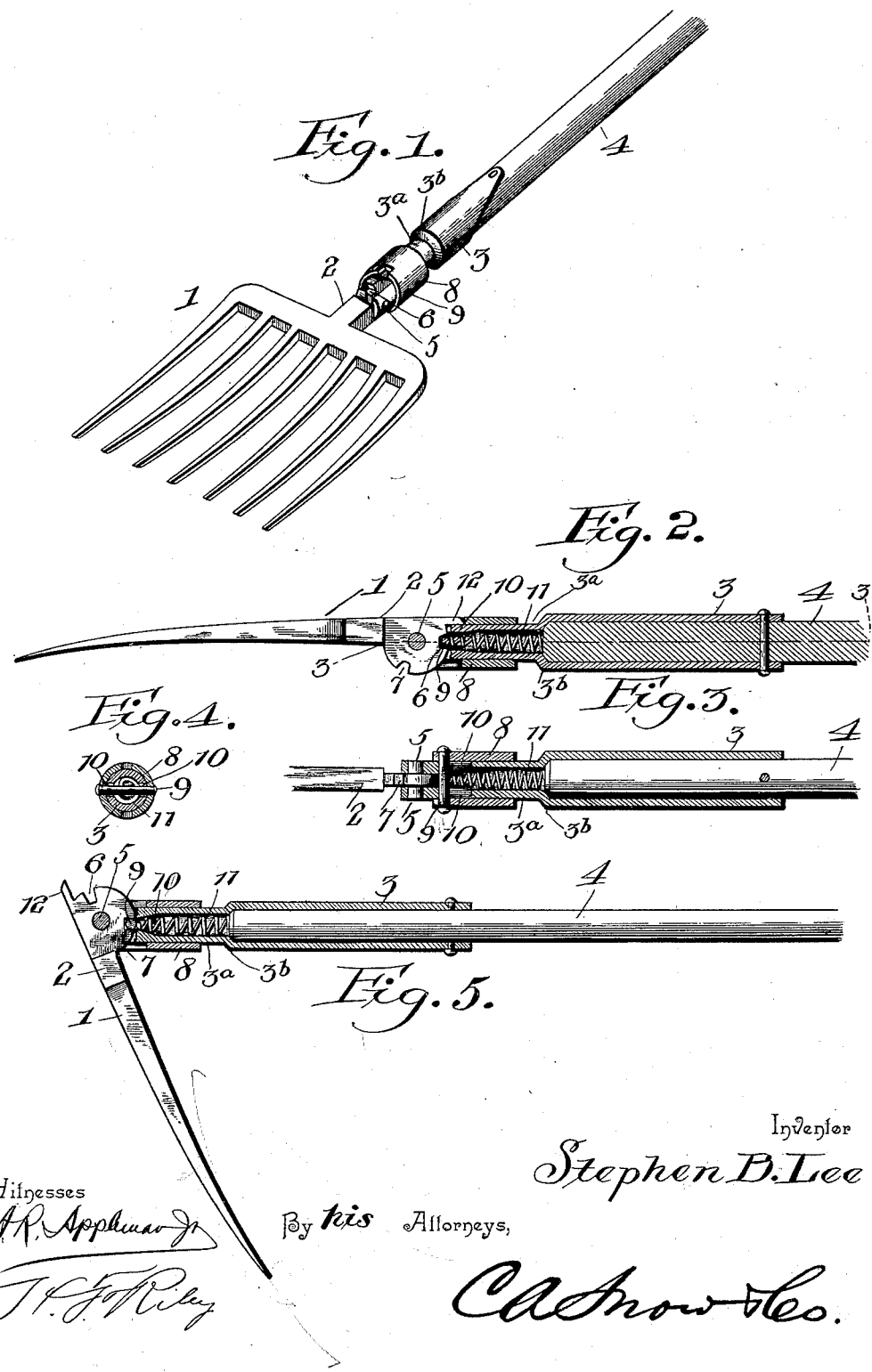
Witnesses
A. R. Appleman
J. F. J. Riley
Inventor
Stephen B. Lee
By his Attorneys,
C. A. Snow & Co.

UNITED STATES PATENT OFFICE.

STEPHEN BAGLEY LEE, OF DANBURY, IOWA.

COMBINED PITCHFORK AND RAKE.

SPECIFICATION forming part of Letters Patent No. 613,012, dated October 25, 1898.

Application filed September 13, 1897. Serial No. 651,492. (No model.)

*To all whom it may concern:*

Be it known that I, STEPHEN BAGLEY LEE, a citizen of the United States, residing at Danbury, in the county of Woodbury and State of Iowa, have invented a new and useful Combined Pitchfork and Rake, of which the following is a specification.

The invention relates to improvements in combined pitchforks and rakes.

The object of the present invention is to improve the construction of combined forks and rakes and to provide a simple, strong, and durable one in which the tines may be readily arranged longitudinally of the handle or transversely thereof to form either a pitchfork or a rake and which will be firmly supported when the parts are arranged to form a fork in order that the device may be employed for lifting large quantities of manure or other material without liability of straining or otherwise injuring the adjusting devices.

The invention consists in the construction and novel combination and arrangement of parts, as hereinafter fully described, illustrated in the accompanying drawings, and pointed out in the claim hereto appended.

In the drawings, Figure 1 is a perspective view of a combined rake and fork constructed in accordance with this invention and shown arranged to form a pitchfork. Fig. 2 is a longitudinal sectional view of the same. Fig. 3 is a similar view on line 3 3 of Fig. 2. Fig. 4 is a transverse sectional view. Fig. 5 is a longitudinal sectional view, the parts being arranged to form a rake.

Like numerals of reference designate corresponding parts in the several figures of the drawings.

1 designates a fork-head provided with a series of tines and having a centrally-arranged shank 2, which is pivoted to a ferrule or sleeve 3 of the handle 4, the ferrule 3 being bifurcated for the reception of the shank and both parts being perforated for a pivot 5. The ferrule 3 has its outer portion 3ª reduced to form a shoulder 3ᵇ. The enlarged inner portion of the ferrule is split or divided, as shown, to form opposite straps or portions and receives the handle 4, which abuts against an interior shoulder formed by the reduced portion at the point 3ᵇ. The outer end of the reduced portion 3ª is thickened, being solid, except for the bifurcation, and the opening or bore tapers toward the bifurcation, as shown. By this construction the strength and durability of the ferrule are materially increased and the fork is securely connected to the handle. The shank 2 is enlarged at its pivoted end and is provided with recesses 6 and 7, located at the end and one side of the shank and adapted to be engaged by a spring-actuated locking device 8, whereby the fork-head is secured in its different positions.

The spring-actuated locking device comprises a sliding sleeve arranged on the outer reduced portion 3ª of the ferrule and a transverse pin 9, passing through longitudinal slots 10 of the said ferrule and arranged to engage the recesses of the shank 2. The spring 11, which is housed within the ferrule, is interposed between the pin 9 and the adjacent end of the handle 4 and has its outer portion tapered, as shown, to conform to the configuration of the interior of the outer tubular portion 3ª. The sliding sleeve is recessed at the top and bottom to clear the shank, and it is adapted to be readily grasped by the operator when it is desired to change the position of the rake-head.

In order to relieve the adjusting mechanism of strain when the fork-head is raised longitudinally of the handle and when it is adapted for lifting heavy loads, the shank is provided with an extension 12, which projects beyond the bifurcation of the ferrule and bears against the outer face thereof, as clearly illustrated in Fig. 2 of the drawings. The extension 12 forms a stop and relieves the transverse pin of the spring-actuated fastening device of strain when the fork is used for lifting or tossing material.

The invention has the following advantages:

The combined rake and fork is simple, strong, and durable, and adapted to be readily changed from one position to the other, so that it may be quickly converted into a pitchfork or rake.

When the device is used as a pitchfork, the shank is firmly supported and the locking device is relieved of strain.

The particular construction of the locking device is such that the spring is housed within the ferrule and the sliding sleeve is disposed on the exterior of the same, so that it may be readily grasped to manipulate the device.

Changes in the form, proportion, and minor details of construction may be resorted to without departing from the spirit or sacrificing any of the advantages of this invention.

What I claim is—

A combined fork and rake, comprising a bifurcated ferrule provided at opposite sides with longitudinal slots, a shank pivoted in the bifurcation and provided with recesses, a rake-head carried by the shank, an exteriorly-arranged sliding sleeve mounted on the ferrule, a transverse pin carried by the sliding sleeve and extending through the slots of the ferrule and adapted to engage the recesses of the shank, and a spiral spring housed within the ferrule and holding the pin in engagement with the shank, substantially as described.

In testimony that I claim the foregoing as my own I have hereto affixed my signature in the presence of two witnesses.

STEPHEN BAGLEY LEE.

Witnesses:
CHAS. H. LEE,
JAMES LEE.